(12) United States Patent
Ishida

(10) Patent No.: US 8,200,808 B2
(45) Date of Patent: Jun. 12, 2012

(54) COMMUNICATION APPARATUS AND COMPUTER PROGRAM

(75) Inventor: Maiko Ishida, Kanagawa (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 1631 days.

(21) Appl. No.: 11/528,526

(22) Filed: Sep. 28, 2006

(65) Prior Publication Data

US 2007/0083651 A1    Apr. 12, 2007

(30) Foreign Application Priority Data

Oct. 11, 2005   (JP) ................................ 2005-296155

(51) Int. Cl.
G06F 15/173    (2006.01)
G06F 3/048    (2006.01)
G06Q 10/00    (2012.01)

(52) U.S. Cl. ...... 709/224; 709/223; 705/7.18; 705/7.19; 705/7.21; 705/7.24; 705/8; 705/9; 715/853; 715/854; 715/762; 715/763; 715/764; 715/765; 715/803; 715/804; 715/805; 715/806; 715/807; 715/808; 715/809; 715/810; 715/851; 715/797; 715/798; 345/334; 345/351; 345/431; 345/963

(58) Field of Classification Search ................ 709/206, 709/223–224; 726/22; 705/8, 9, FOR. 111, 705/FOR. 112, 7.18, 7.19, 7.21, 7.24; 715/853, 715/854, 762, 763, 764, 765, 803, 804, 805, 715/806, 807, 808, 809, 810, 851, 797, 798; 345/351, 334, 431, 963

See application file for complete search history.

(56) References Cited

U.S. PATENT DOCUMENTS

| | | | | |
|---|---|---|---|---|
| 5,621,876 | A * | 4/1997 | Odam et al. | 715/212 |
| 5,774,357 | A * | 6/1998 | Hoffberg et al. | 713/600 |
| 5,805,444 | A * | 9/1998 | Seymour | 700/16 |
| 5,920,477 | A * | 7/1999 | Hoffberg et al. | 382/181 |
| 5,936,625 | A * | 8/1999 | Kahl et al. | 715/775 |
| 6,064,975 | A * | 5/2000 | Moon et al. | 705/7.13 |
| 6,380,953 | B1 * | 4/2002 | Mizuno | 715/764 |
| 6,654,034 | B1 * | 11/2003 | Kanevsky et al. | 715/764 |
| 7,117,531 | B2 * | 10/2006 | Fukasawa | 726/22 |

(Continued)

FOREIGN PATENT DOCUMENTS

EP    1533714 A2    5/2005

(Continued)

OTHER PUBLICATIONS

Japanese Office Action issued Mar. 5, 2009 for corresponding Japanese Application No. 2005-296155.

(Continued)

Primary Examiner — John Follansbee
Assistant Examiner — Saket K Daftuar
(74) Attorney, Agent, or Firm — Rader Fishman & Grauer, PLLC

(57) ABSTRACT

A communication apparatus includes history information storing means for storing history information on communication; displaying means for displaying a calendar; means for classifying the history information on the communication of each day into a plurality of patterns; and image storing means for storing beforehand images corresponding to the plurality of patterns, wherein the displaying means displays an image corresponding to a pattern corresponding to the history information on the communication of each day, in correspondence with each day of the calendar, when the calendar is displayed.

17 Claims, 15 Drawing Sheets

U.S. PATENT DOCUMENTS

| | | | |
|---|---|---|---|
| 7,126,587 B2 * | 10/2006 | Kawakami et al. | 345/168 |
| 7,171,186 B2 * | 1/2007 | Miyachi et al. | 455/343.5 |
| 7,295,836 B2 * | 11/2007 | Yach et al. | 455/415 |
| 7,343,365 B2 * | 3/2008 | Farnham et al. | 715/853 |
| 7,353,350 B2 * | 4/2008 | Klassen et al. | 711/159 |
| 7,376,909 B1 * | 5/2008 | Coyle | 715/778 |
| 7,505,762 B2 * | 3/2009 | Onyon et al. | 455/419 |
| 7,546,347 B2 * | 6/2009 | Watanabe et al. | 709/206 |
| 7,574,661 B2 * | 8/2009 | Matsuura et al. | 715/745 |
| 7,630,986 B1 * | 12/2009 | Herz et al. | 1/1 |
| 7,721,224 B2 * | 5/2010 | Sellen et al. | 715/804 |
| 7,747,966 B2 * | 6/2010 | Leukart et al. | 715/792 |
| 8,010,579 B2 * | 8/2011 | Metsatahti et al. | 707/805 |
| 2002/0026589 A1 * | 2/2002 | Fukasawa | 713/200 |
| 2002/0054103 A1 * | 5/2002 | Mizuno | 345/764 |
| 2002/0059418 A1 * | 5/2002 | Bird et al. | 709/224 |
| 2002/0128036 A1 * | 9/2002 | Yach et al. | 455/552 |
| 2003/0014296 A1 * | 1/2003 | Meine | 705/9 |
| 2003/0038791 A1 * | 2/2003 | Chou | 345/204 |
| 2003/0229671 A1 * | 12/2003 | Kadomatsu et al. | 709/206 |
| 2004/0014489 A1 * | 1/2004 | Miyachi et al. | 455/550.1 |
| 2004/0039630 A1 * | 2/2004 | Begole et al. | 705/11 |
| 2004/0063424 A1 * | 4/2004 | Silberstein et al. | 455/410 |
| 2004/0113928 A1 * | 6/2004 | Kobayashi et al. | 345/700 |
| 2004/0143634 A1 * | 7/2004 | Watanabe et al. | 709/206 |
| 2004/0153431 A1 * | 8/2004 | Bhogal et al. | 707/1 |
| 2004/0225969 A1 * | 11/2004 | Droegemueller et al. | 715/804 |
| 2004/0260584 A1 * | 12/2004 | Terasawa | 705/7 |
| 2005/0005249 A1 * | 1/2005 | Hill et al. | 715/963 |
| 2005/0044500 A1 * | 2/2005 | Orimoto et al. | 715/706 |
| 2005/0188018 A1 * | 8/2005 | Endo et al. | 709/206 |
| 2005/0191998 A1 * | 9/2005 | Onyon et al. | 455/419 |
| 2005/0215310 A1 * | 9/2005 | Boyd et al. | 463/20 |
| 2005/0239494 A1 * | 10/2005 | Klassen et al. | 455/550.1 |
| 2006/0015583 A1 * | 1/2006 | Uchida | 709/219 |
| 2006/0075030 A1 * | 4/2006 | van Riel | 709/206 |
| 2006/0095331 A1 * | 5/2006 | O'Malley et al. | 705/22 |
| 2006/0124897 A1 * | 6/2006 | Shingai et al. | 252/299.01 |
| 2006/0156251 A1 * | 7/2006 | Suhail et al. | 715/809 |
| 2006/0158385 A1 * | 7/2006 | Etelapera | 345/31 |
| 2007/0061023 A1 * | 3/2007 | Hoffberg et al. | 700/83 |
| 2007/0106131 A1 * | 5/2007 | Lin et al. | 600/301 |
| 2008/0155215 A1 * | 6/2008 | Matsuzaki et al. | 711/162 |

FOREIGN PATENT DOCUMENTS

| | | |
|---|---|---|
| JP | 11-098284 | 4/1999 |
| JP | 2004-523018 | 7/2004 |
| JP | 2004-265250 | 9/2004 |
| JP | 2005-275657 | 10/2005 |
| WO | WO-02/07057 | 1/2002 |

OTHER PUBLICATIONS

Extended European Search report issue Dec. 12, 2009 for corresponding European Application No. 06 12 1999.

* cited by examiner

FIG.4A

MAIL RECEPTION HISTORY INFORMATION 310

| No. | DATE/TIME | SENDER | TITLE | TEXT | ATTACHED DATA |
|-----|-----------|--------|-------|------|---------------|
| 001 | | | | | |
| 002 | | | | | |
| ⋮ | ⋮ | ⋮ | ⋮ | ⋮ | ⋮ |

FIG.4B

MAIL TRANSMISSION HISTORY INFORMATION 320

| No. | DATE/TIME | RECEIVER | TITLE | TEXT | ATTACHED DATA |
|-----|-----------|----------|-------|------|---------------|
| 001 | | | | | |
| 002 | | | | | |
| ⋮ | ⋮ | ⋮ | ⋮ | ⋮ | ⋮ |

FIG. 5A

INCOMING CALL
HISTORY INFORMATION                    410

| No. | DATE/TIME | CALLER | CALL TIME |
|-----|-----------|--------|-----------|
| 001 |           |        |           |
| 002 |           |        |           |
| ⋮   | ⋮         | ⋮      | ⋮         |

FIG. 5B

OUTGOING CALL
HISTORY INFORMATION                    420

| No. | DATE/TIME | PARTNER | CALL TIME |
|-----|-----------|---------|-----------|
| 001 |           |         |           |
| 002 |           |         |           |
| ⋮   | ⋮         | ⋮       | ⋮         |

FIG.7A
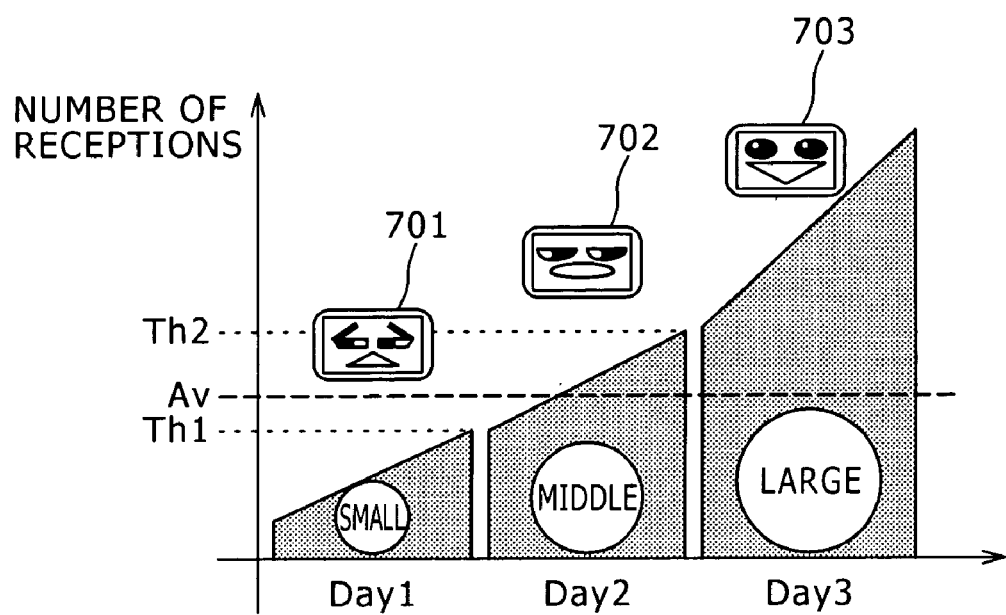
FIG.7B  FIG.7C  FIG.7D
  

COMMUNICATION APPARATUS AND COMPUTER PROGRAM

BACKGROUND OF THE INVENTION

1. Field of the Invention

The present invention relates to a communication apparatus having a function of mainly transmitting and receiving an electronic mail.

2. Description of Related Art

Mobile phone terminals are used widely in recent years and are necessities for many people because of their multi functions including, in addition to a call function, various functions of scheduling, alarming, electronic mailing, Web browsing, photographing and the like.

Particularly, an electronic mail function allows transmission/reception of mails at any location and at any time in a communicable area. This function is an essential tool for communications among many people. Although the use frequency of mails and calls varies with each user, the use frequency of mails of mobile phones is high, for example, for teen-age girls.

History information on transmission/reception of mails and phones is automatically stored and a user can confirm the history information. In a proposed history information display method, the number of communication histories is displayed for each date (refer to Japanese Patent Application Publication No. HEI-11-98284). Specifically, text information such as "PHONE: 5, FAX: 5, MAIL: 2" in one day is displayed in the field of each day of one month calendar. If a particular connection type is designated on the calendar, the details of communication history data can be displayed.

SUMMARY OF THE INVENTION

A mobile phone terminal is an apparatus used by each individual person, and transmission/reception of mails using the mobile phone terminal is often used for private communications. A user exchanging several tens of private mails per each day is concerned about the numbers of mails and calls of each day and a change in these numbers, about who sent large number of mails and calls, about which is larger between transmission numbers and reception numbers, and the like.

The conventional techniques described in Japanese Patent Application Publication No. HEI-11-98284 can view a list of communication numbers of each day. However, even if each communication number is indicated by a numerical character, a user is required to read each numerical character and it is not always easy to recognize each numerical character. Available information is limited only to the numbers of communications. There is another problem that a text only display lacks entertainment nature.

The present invention has been made in this background. The present invention provides a communication apparatus capable of extracting information in accordance with communication history information of a user and displaying the extracted information in correspondence with a calendar in a manner easy to grasp visually, and a computer program to be executed by the communication apparatus.

According to an embodiment of the present invention, there is provided a communication apparatus including history information storing means for storing history information on communication, displaying means for displaying a calendar, means for classifying the history information on the communication of each day into a plurality of patterns, and image storing means for storing beforehand images corresponding to the plurality of patterns. The displaying means displays an image corresponding to a pattern corresponding to the history information on the communication of each day, in correspondence with each day of the calendar, when the calendar is displayed. Accordingly, a communication state based on the history information on the communication can be viewed as a list for each day of the calendar. Therefore, a communication state of each day and a change in the communication state in each day can be recognized easily.

More specifically, it is possible to display, in addition to an image to be displayed in accordance with whether the number of receptions of each day is large or small, an image representative of that a predetermined ratio or more of receptions is from the same sender, an image representative of a protective mail which is a mail inhibited to be erased, among mails received in a day, and other images.

The contents of the protective mail may be displayed in an area different from a display area for the calendar.

According to another embodiment of the present invention, there is provided a communication apparatus which further includes statistic information extracting means for extracting statistic information from the history information, wherein separately from the calendar display, the displaying means conducts a graph display of displaying a change in at least one of the number of transmissions and the number of receptions during a predetermined period, in accordance with information obtained by the statistic information extracting means.

According to one embodiment of the present invention, there is provided a computer program for causing a computer to make a display of a calendar on a communication apparatus, which includes the steps of storing history information on communication each time the communication is performed, classifying the history information on the communication of each day into a plurality of patterns, displaying the calendar, and referring to images stored beforehand in correspondence with the plurality of patterns and displaying an image corresponding to a pattern corresponding to the history information on the communication of each day, in correspondence with each day of the calendar, when the calendar is displayed.

BRIEF DESCRIPTION OF THE DRAWINGS

The present invention will become more readily appreciated and understood from the following detailed description of embodiments and examples of the present invention when taken in conjunction with the accompanying drawings, in which:

FIGS. 4A and 4B are diagrams schematically showing in a table format mail reception history information and mail transmission history information according to the embodiment of the present invention;

FIGS. 5A and 5B are diagrams schematically showing in a table format incoming call history information and outgoing call history information according to the embodiment of the present invention;

FIGS. 7A to 7D are diagrams showing threshold values Th1 and Th2 for classifying the numbers of receptions into ""small", "middle" and "large" according to the embodiment of the present invention;

DESCRIPTION OF THE PREFERRED EMBODIMENT

A preferred embodiment of the present invention will be described in detail with reference to the accompanying drawings. Target users of the embodiment are directed to users, e.g., teen-age girls, who are expected to transmit/receive a considerable number of mails, e.g., 40 mails or more, per day. The contents given in this specification are only illustrative examples and are not intended to limit the scope of the present invention.

Figure 1:
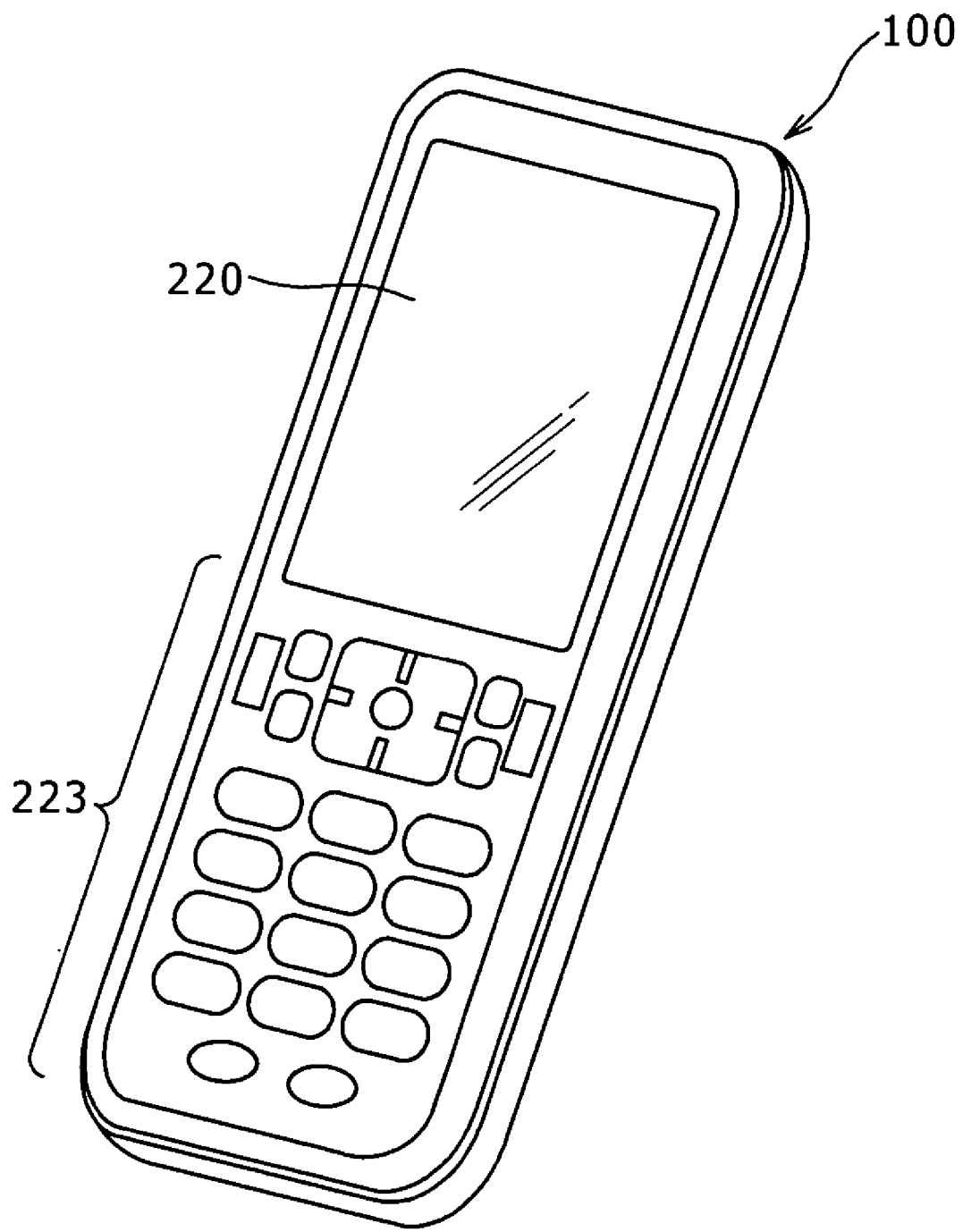
FIG. 1 is a perspective view of a mobile phone terminal as one example of communication apparatus of the present invention.

FIG. 1 is a perspective view of a mobile phone terminal 100 as one example of communication apparatus of the present invention. The terminal 100 has a display unit 220 accommodated in a housing and an operation unit 223. The display unit 220 is a user interface for supplying a user with various visual information, and has a display device typically a liquid crystal display, an organic EL display or the like. The operation unit 223 is a user interface for entering designation and information from a user, and has various keys (push buttons) typically, keys (ten-keys) for entering characters, numerals, symbols and the like, a key for designating up, down, right and left directions, a software key sequentially assigned with functions, a power source key, a call key and the like.

Figure 2:
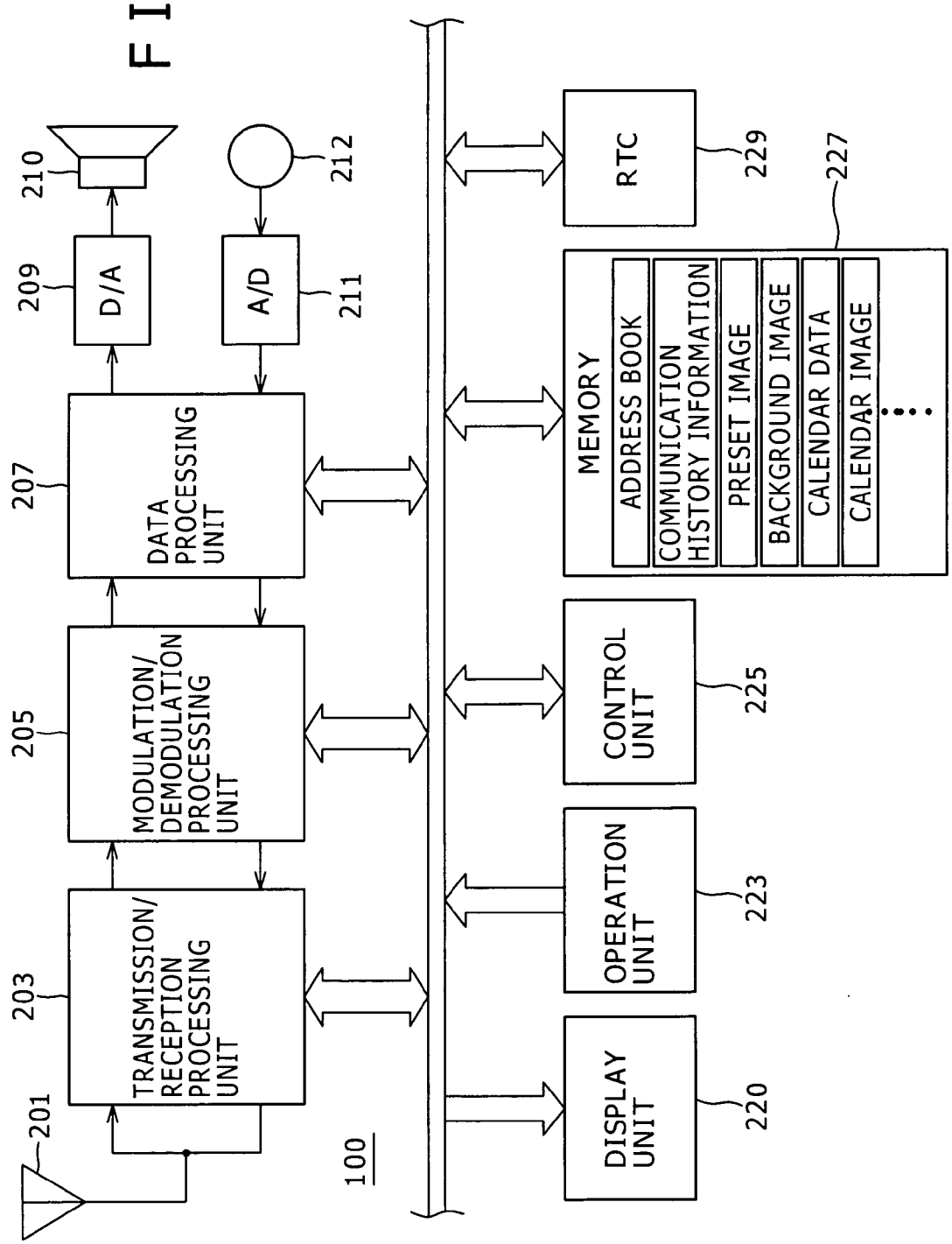
FIG. 2 is a block diagram showing the outline of a hardware structure of the mobile phone terminal shown in FIG. 1.

FIG. 2 shows the hardware structure of the mobile phone terminal 100 shown in FIG. 1. The mobile phone terminal 100 has, as components specific to a general mobile phone, an antenna 201, a transmission/reception processing unit 203, a modulation/demodulation processing unit 205, a data processing unit 207, a D/A converter 209, a speaker 210, an A/D converter 211 and a microphone 212. The mobile phone terminal 100 has also a control unit 225 including a CPU, a ROM and the like for controlling the above-mentioned components, a memory 227 to be used by the control unit 225 as a working area and a data temporary storage area, the display unit 220 and operation unit 223, and a real time clocks (RTC) 229. A plurality of speakers 210 may be provided for speech and incoming call. The control unit 225 has a ROM, an electrically erasable and programmable read-only memory (EEPROM) or the like for storing control programs and fixed data to be used for various operations for a usual mobile phone terminal such as receiving an operation input, communications, mail processing, Web processing, displaying, voice input/output, a telephone directory management, schedule management and the like. The memory 227 stores various data such as address book data, communication history data, preset image date, background image data, calendar data, and calendar image data. The real time clock (RTC) 229 is a block for supplying date/time management and timer function.

Figure 3:
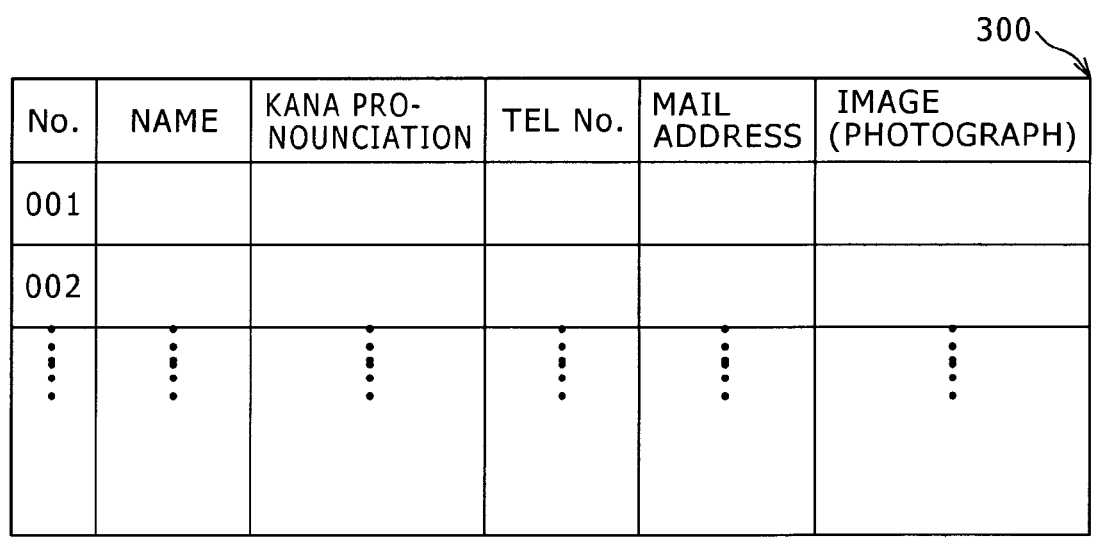
FIG. 3 is a diagram schematically showing in a table format the structure of an address book stored in a memory of the mobile phone terminal shown in FIG. 1.

FIG. 3 is a diagram schematically showing in a table format the structure of an address book 300 stored in the memory 227 of the mobile phone terminal 100. Personal information is registered in the address book 300 upon an instruction operation by a user, the personal information including a "NAME, "KANA PRONUNCIATION", "TEL No.", "MAIL ADDRESS", "IMAGE (PHOTOGRAPH)" and the like of each partner. Other personal information may also be registered including an address, a birth day, an interest, a zodiac sign and the like. The address book is managed by entering a serial number in a record of each registrant in the order of registration.

FIGS. 4A and 4B are diagrams schematically showing in a table format mail reception history information 310 and mail transmission history information 320. The mail reception history information 310 includes "DATE/TIME", "SENDER (NAME)", "ATTACHED DATA" and the like of each reception mail, each record being managed by adding a serial number in the order of reception. The "SENDER" is a registered name if the mail partner is registered in the address book, or a partner name or mail address contained in the mail if the mail partner is not registered.

The mail transmission history information 320 includes "DATE/TIME", "RECEIVER", "TEXT" and "ATTACHED DATA" of each transmission mail, each record being managed by adding a serial number in the order of transmission. The "RECEIVER" is a registered name if the mail receiver is registered in the address book, or a mail address if the mail receiver is not registered.

FIGS. 5A and 5B are diagrams schematically showing in a table format incoming call history information 410 and outgoing call history information 420. The incoming call history information 410 includes "DATE/TIME", "CALLER" and "CALL TIME" of each incoming call, each record being managed by adding a serial number in the order of incoming call. The "CALLER" is a registered name if the caller is registered in the address book, or a partner telephone number if the caller is not registered.

The outgoing call history information 420 includes "DATE/TIME", "PARTNER" and "CALL TIME" of each outgoing call, each record being managed by adding a serial number in the order of outgoing call. The "PARTNER" is a registered name if the partner is registered in the address book, or a partner telephone number if the partner is not registered.

An operation of the embodiment will be described below. In the following, although description will be made by using mainly a mail as the communication type, the present invention is also applicable to a telephone, except for items specific to a mail.

[Calendar Display]

Figure 6:
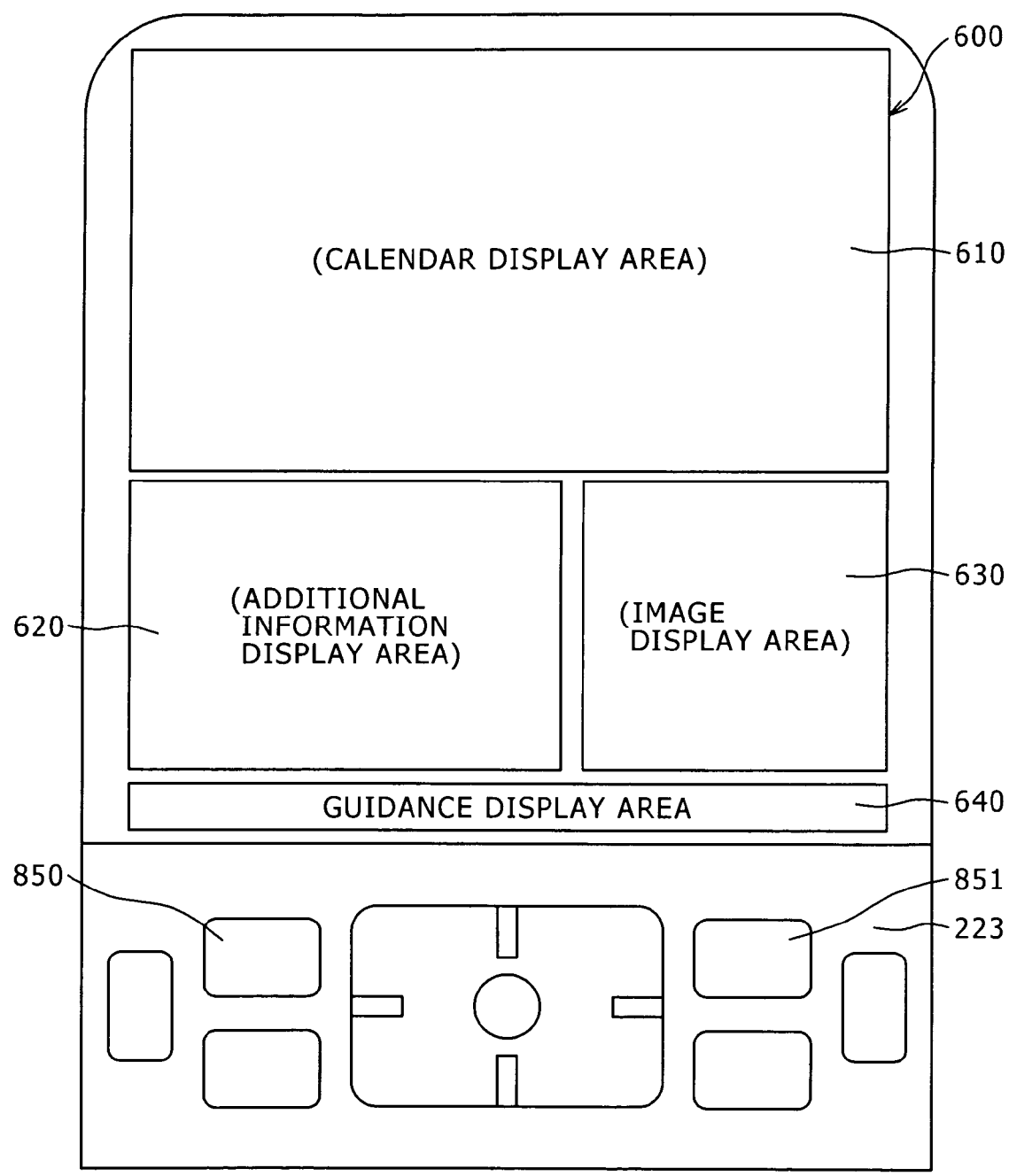
FIG. 6 is a diagram showing a screen structure for displaying a calendar according to the embodiment of the present invention.

FIG. 6 is a diagram showing a screen structure for displaying a calendar according to the embodiment. A display screen 600 for displaying a calendar includes in this example at least a calendar display area 610 for displaying a calendar in a monthly unit, an additional information display area 620 for displaying additional information, an image display area 630 for displaying an image, and a guidance display area 640 for displaying contents of software key assignments etc.

In this embodiment, the calendar in a monthly unit is displayed in a matrix shape in which a plurality of rows each indicating seven days of a week are juxtaposed, as will be later described with reference to the drawings. As will be later described, the additional information display area 620 displays additional information such as statistic information on a subject day and contents of a subject mail. The image display area 630 displays an image (photograph or the like) of a sender of a subject mail, a preset image and the like.

The contents displayed in the additional information display area 620 and image display area 630 change in accordance with the day presently selected (emphasized with a cursor or the like) in the calendar display area 610. The cursor can be moved as desired by a user by operating the operation unit 223.

In this embodiment, an image is allocated to each day of the calendar in accordance with communication history information, and displayed in the field of the day of the calendar. This "image" is not directly related to the image displayed in the image display area 630, but represents information obtained from the communication history information of each day. In this specification, an image displayed in each day field of the calendar is called an icon to distinguish it from the image displayed in the image display area 630.

The icon is assigned in accordance with a plurality of parameters. The parameters include "NUMBER OF RECEPTIONS", "PROTECTIVE MAIL (PRESENCE/ABSENCE)" and "SENDER OF MAXIMUM NUMBER" of each day obtained from the history information, and have each a priority order. The "PROTECTIVE MAIL" has a highest priority order, and the "SENDER OF MAXIMUM NUMBER" and "NUMBER OF RECEPTIONS" have next and second next priority orders. The priority order is not limited to this and may be set variably by a user.

(1) Number of Receptions

An average number of mail receptions during a predetermined period is first obtained. The predetermined period is a period from the terminal purchase day to the present day, or a period from the present day back to a predetermined term (e.g., one month, several months, one year, etc), and the like. For the former period, an average number can be obtained from the terminal use start time to the present time, whereas for the latter period, an average number can be obtained by adding weight to the recent usage. In the present invention, the numbers of receptions are classified into a plurality of patterns in accordance with the degree of the number of receptions in a subject day. In this embodiment, as shown in FIG. 7A, two threshold values Th1 and Th2 (Th2>Th1) are obtained from an average number Av. The numbers of receptions are classified into three stages of "SMALL", "MIDDLE" and "LARGE" in accordance with the threshold values Th1 and Th2. For example, the threshold values Th1 and Th2 may be obtained by the following method, although not limited thereto.

(a) A twofold of the average value Av is assumed to be a maximum value and this maximum value is divided into three equal regions:

$$Th1 = (Av \times 2) \times 1/3$$

$$Th2 = (Av \times 2) \times 2/3$$

(numbers smaller than a decimal point is subjected to half-adjust or round-down)

(b) An average value Av±a predetermined value is used as two threshold values:

$$Th1 = Av - X$$

$$Th2 = Av - X$$

Although X may be a fixed value, it is preferable that X changes with the average value in order to prevent an extreme deviation of the numbers of receptions "SMALL", "MIDDLE" and "LARGE" in the three regions to be caused by a large or small average value. To this end, for example:

$$X = a \times Av$$

where the coefficient a is a positive number smaller than 1. If a=1/3, the threshold values are the same as those shown in (a). If the coefficient a is made smaller, the width of the region "SMALL" is narrowed, whereas if the coefficient a is made larger, the width of the region "MIDDLE" is broadened.

The numbers of receptions at three stages classified in this manner are assigned icons 701, 702 and 703 indicating emotional degrees. The icon 701 assigned to "SMALL" indicates a lonely countenance, the icon 702 assigned to "MIDDLE" indicates a normal countenance, and the icon 703 assigned to "LARGE" indicates a cheer countenance. As shown in FIGS. 7B, 7C and 7D, images 701' to 703' are displayed in the image display area 630 in correspondence with the icons 701 to 703.

Figure 8:
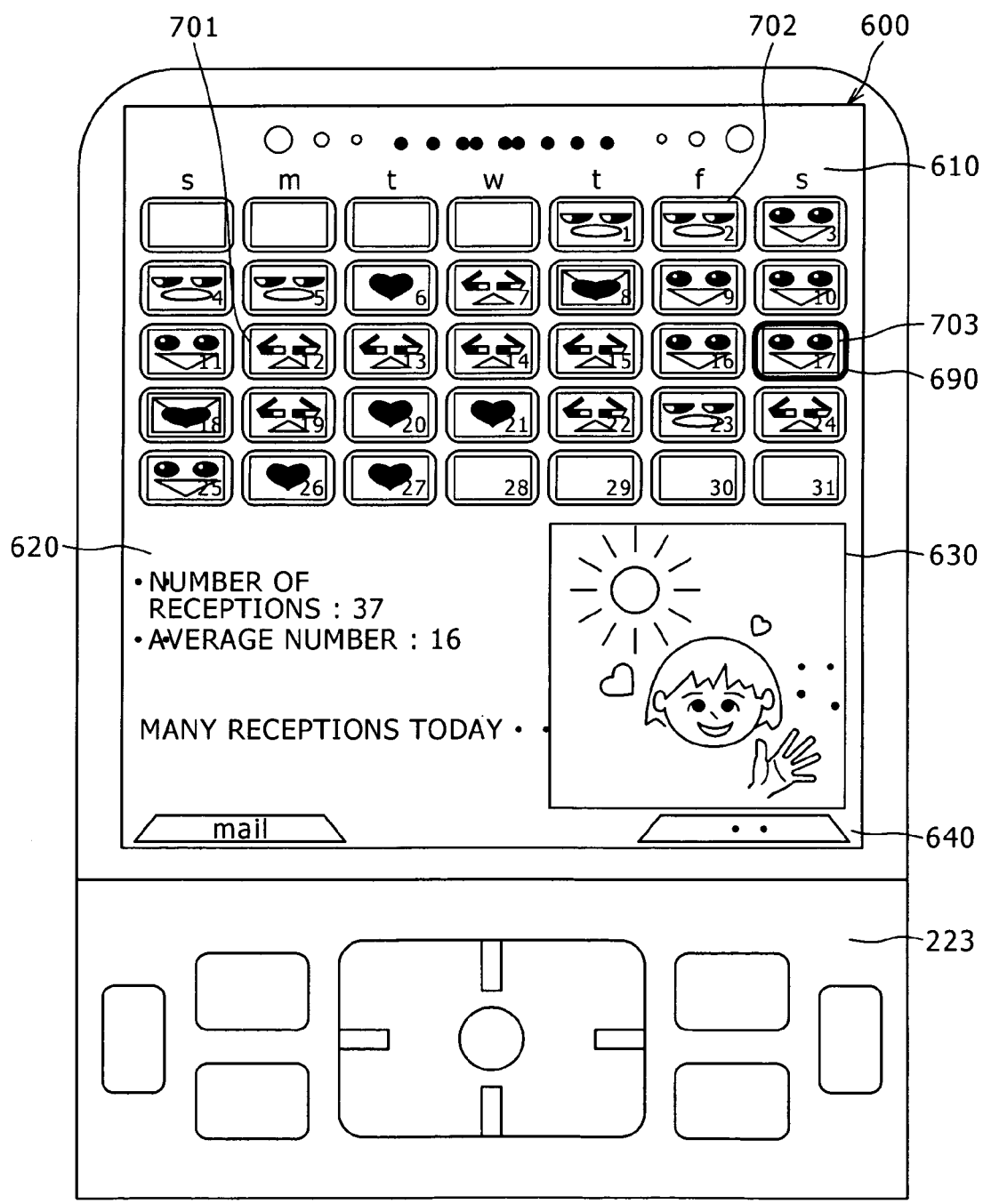
FIG. 8 is a diagram showing an example of a display screen for displaying a calendar according to the embodiment of the present invention.

FIG. 8 is a diagram showing an example of a display screen 600 displaying a calendar. The calendar of July 2004 is displayed in the calendar display area 610. The day when the calendar is displayed is Jul. 27, 2004, and the fields of July 28 and succeeding days are empty. The state that a cursor 690 is positioned on July 17 is shown, and the number of receptions and an average number of July 17 are shown in the additional information display area 620. A message such as "MANY RECEPTIONS TODAY" to be described later is also shown. The image 703' corresponding to the icon 703 of the day designated by the cursor 690 is displayed in the image display area 630.

(2) Protective Mail (Presence/Absence)

A mail inhibited for a user (receiver) to accidentally erase is called a protective mail. If even one protective mail exists among mails received in the subject day, an image preset for the protective mail is assigned to the subject day. The contents of the protective mail are displayed in the additional information display area. An icon (at 704 of FIG. 9 to be described later) representative of the protective mail is displayed in the field of a corresponding day of the calendar.

Figure 9:
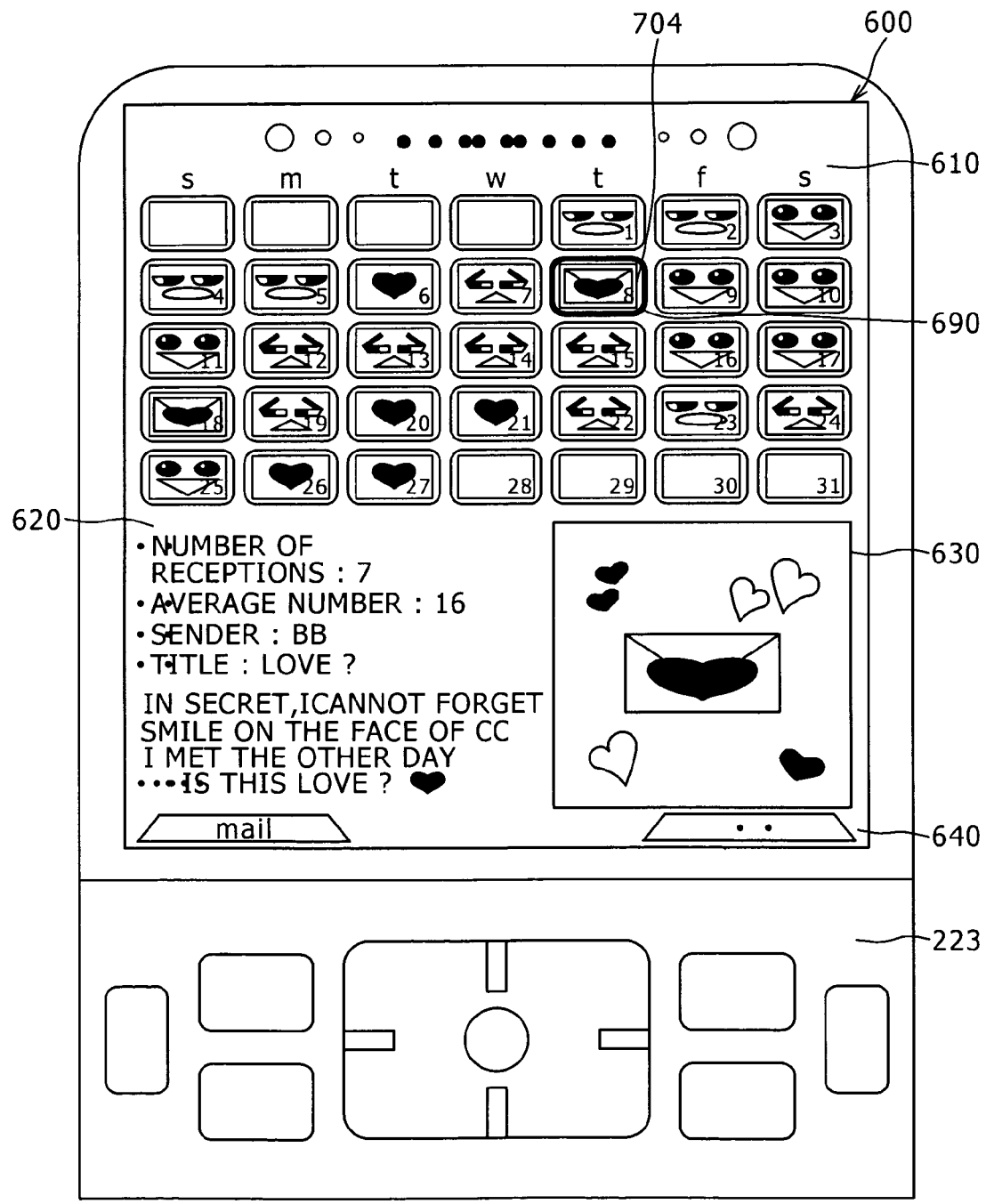
FIG. 9 is a diagram showing an example of a display screen for displaying a calendar when a date having a protective mail is selected, according to the embodiment of the present invention.

FIG. 9 is a diagram showing an example of a display screen displaying a calendar when the day (July 8) having a protective mail is selected. The contents in the calendar display area 610 are the same as those shown in FIG. 8, but the position of the cursor 690 is different. The day with the cursor 690 has a protective mail, and an icon 704 (in this example, a design of a mail sealed with a heart mark) representative of the protective mail is displayed in the field of the day. In addition to the number of receptions and average number of the day, the contents of the protective mail are displayed in the additional information display area 620. A particular preset image corresponding to the protective mail is displayed in the image display area 630. Instead, an image (photograph or the like) of the sender of the protective mail may be displayed. However, if there exists a plurality of protective mails and different senders, an image of one sender selected according to a predetermined rule is displayed. The predetermined rule is arbitrary such as selecting a sender with a latest reception time/date or a sender with an oldest reception time/date, and randomly selecting a sender.

(3) Sender of Maximum Number

If a half or more of mails received in the subject day were received from the same sender, an icon of a heart symbol is displayed in the field of the day. A registered image (if present) of the sender is displayed in the image display area 630.

Figure 10:
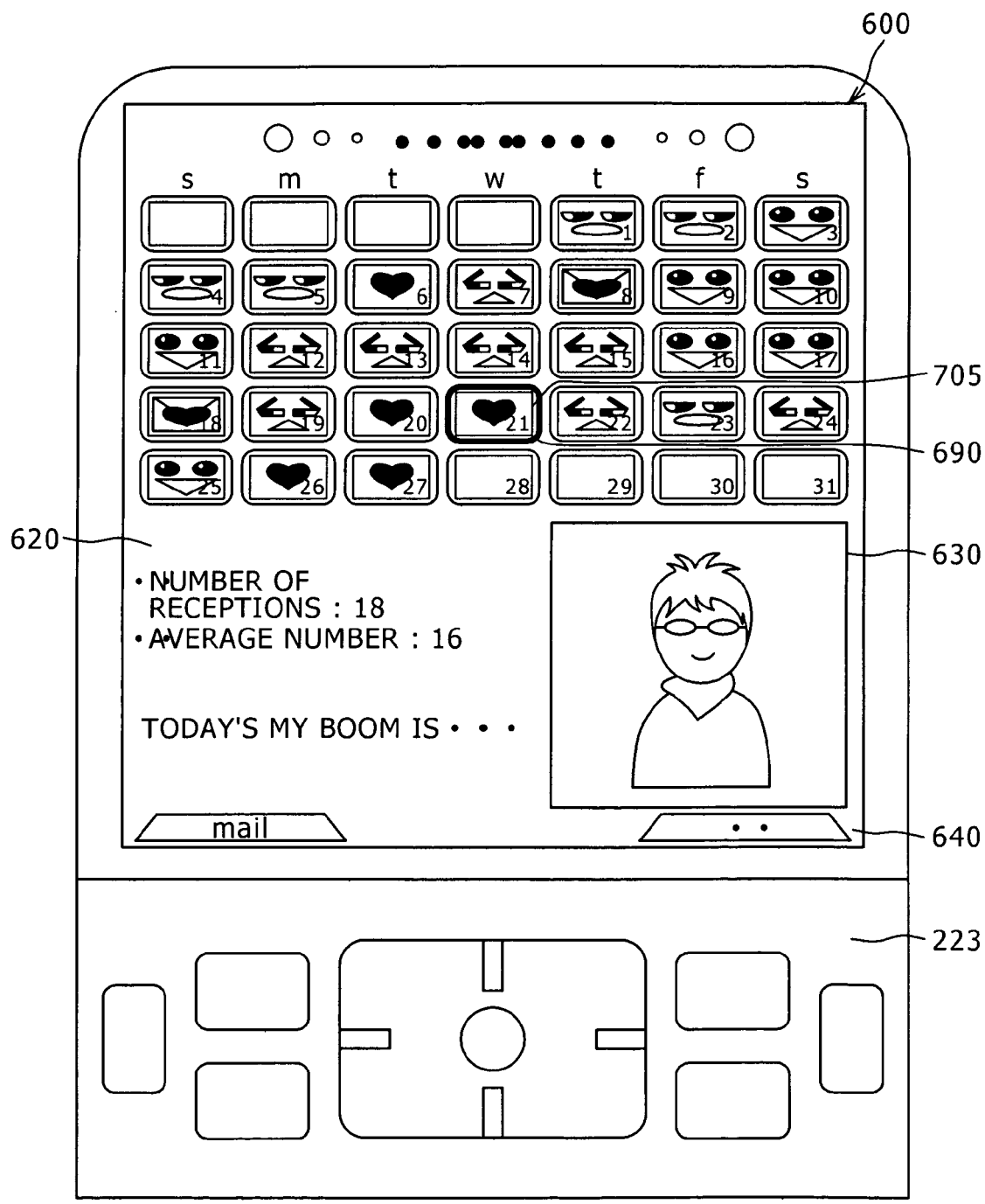
FIG. 10 is a diagram showing a display screen for displaying a calendar when a date having the maximum number of receptions is selected, according to the embodiment of the present invention.

FIG. 10 is a diagram showing a display screen displaying a calendar when a day with a maximum number sender is selected. The contents in the calendar display area 610 are the same as those shown in FIG. 8, but the position of the cursor 690 is different. In this example, the cursor 690 is positioned in the field of July 21. The maximum number sender exists in this day, and an icon 705 (a heart symbol) representative of existence of the maximum number sender is displayed in the field of the day. In addition to the number of receptions and average number, a particular message to be described later is displayed in the additional information display area 620. An image (portrait) of the maximum number sender is displayed in the image display area 630. If the number of receptions is extremely small (e.g., several mails), the meaning of "maximum number" is thinned. Therefore, judging the maximum number sender may be performed only when the number of receptions in a day is a predetermined value or larger.

If there is a protective mail, the image of the mail sender is displayed in the image display area 630, with priority over other images. If there is no protective mail, a registered image (if present) of the maximum number sender is displayed, whereas if not, a preset image is selected and displayed in accordance with a predetermined flow.

The number of mail receptions and average number of the subject day are displayed on the additional information display area 620. If there is a protective mail, the mail contents (title, sender and ext) are displayed. If there is a plurality of protective mails in the same day, one protective mail is automatically selected from the serial number or randomly selected. If the contents of the received mail are not displayed in the additional information display area 620, another message may be displayed. For example, if the image of the maximum number sender is displayed in the image display area 630, a message such as "TODAY'S MY BOOM IS ○○" may be displayed. The sender name is inserted into "○○". In accordance with the number of receptions, a message indicating whether the number of receptions is large or not, such as "MANY RECEPTIONS TODAY" and "SMALL RECEPTIONS TODAY" may be displayed.

In the display screens shown in FIGS. 8 to 10, user communication history information is reflected sequentially in time. The user interface of this type functions in some way as a personal history of communications with others.

[Mail List]

Figure 11:
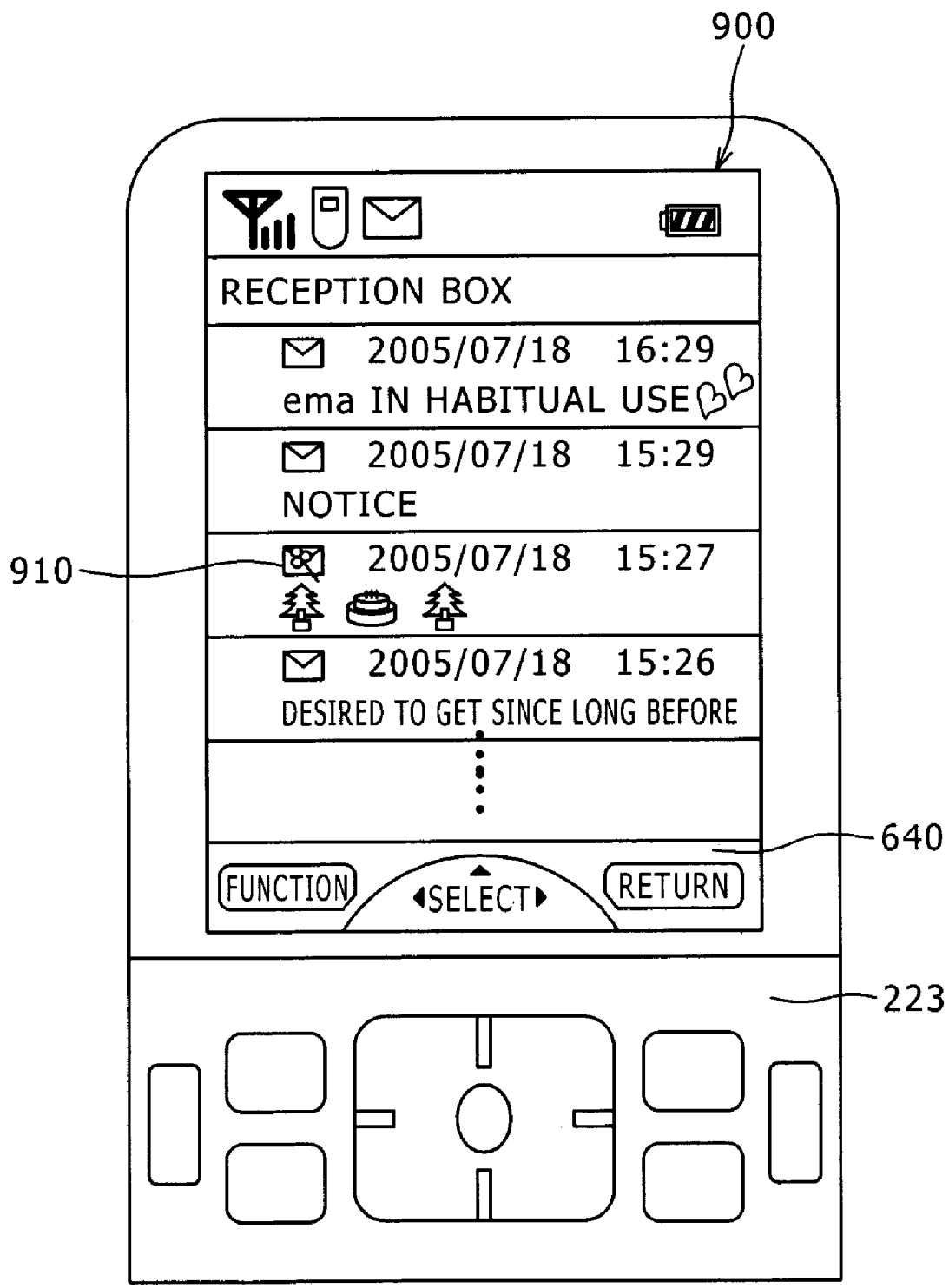
FIG. 11 is a diagram showing a mail list screen for displaying a reception box in a specific day according to the embodiment of the present invention.

As a user moves the cursor to a particular effective day of the calendar display screen described above and issues a predetermined instruction (in this case, depression of a left software key (a mail key)), a mail list screen 900 of a reception box of the day such as shown in FIG. 11 is displayed. This display can be performed by utilizing an existing search function of each terminal. In this example, mails including a protective mail are displayed. An icon 910 representative of the protective mail is used in the reception box, and is not necessarily required to be the same as the icon 705 of the protective mail in the calendar display area 610 (in this example, the ions are not coincident).

[Graph Display]

Figure 12:
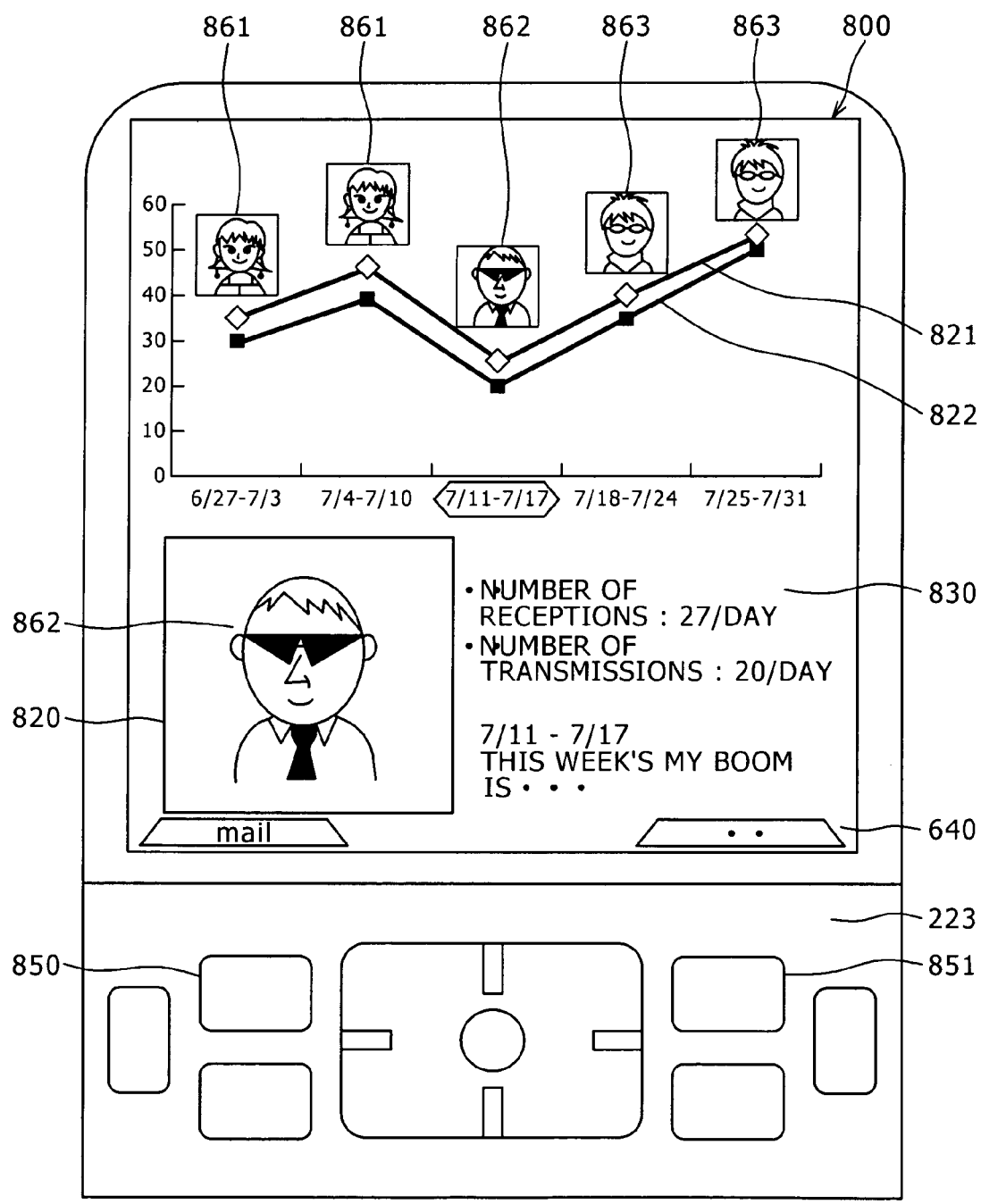
FIG. 12 is a diagram showing a graph display screen according to the embodiment of the present invention.

FIG. 12 is a diagram showing a graph display screen 800 to be displayed when a user issues a predetermined instruction (in this example, an instruction by a right software key (a star mark key) 640 on the screen 600 or 800). As different from displaying a calendar, this screen displays a graph showing a change in the numbers of transmissions and receptions during a predetermined period in a graph display area 810 in accordance with statistic information. The number of receptions in a unit period (in this example, one week) is shown by a polygonal line graph 821, and the number of transmissions is shown by a polygonal line graph 822. In FIG. 12, although the average number in each day is shown, the total number in one week may be additionally used or replaced with the average number. Registered images 861 to 862 of maximum number senders during respective unit periods are reduced to a predetermined size and displayed in correspondence with the numbers of receptions of the polygonal line graphs. The registered image (in this example, image 862) of the maximum number sender in the presently set unit period is displayed in an image display area 820 different from the graph display area 810. Additional information is displayed in an additional information display area 830 adjacent to the image display area 820. In this example, the unit period "7/11 to 7/17" and a message "THIS WEEK'S MY BOOM IS ΔΔ" is displayed. The partner name of the image is inserted into "ΔΔ".

Portable Phone White Paper 2005 shows the data that the number of receptions is larger than the number of transmissions in average Japanese living. In most of graphs showing the numbers of transmissions and receptions, it is anticipated that the number of receptions exceeds the number of transmissions. It can therefore be analyzed that if the number of transmissions exceeds the number of receptions, the caller feels solitary and lonely. The analysis results of this kind may be displayed as texts or graphics.

[Various Process Flows]

Next, description will be made on the process flows to be executed by the control unit to realize the above-described operation of the embodiment.

Figure 13:
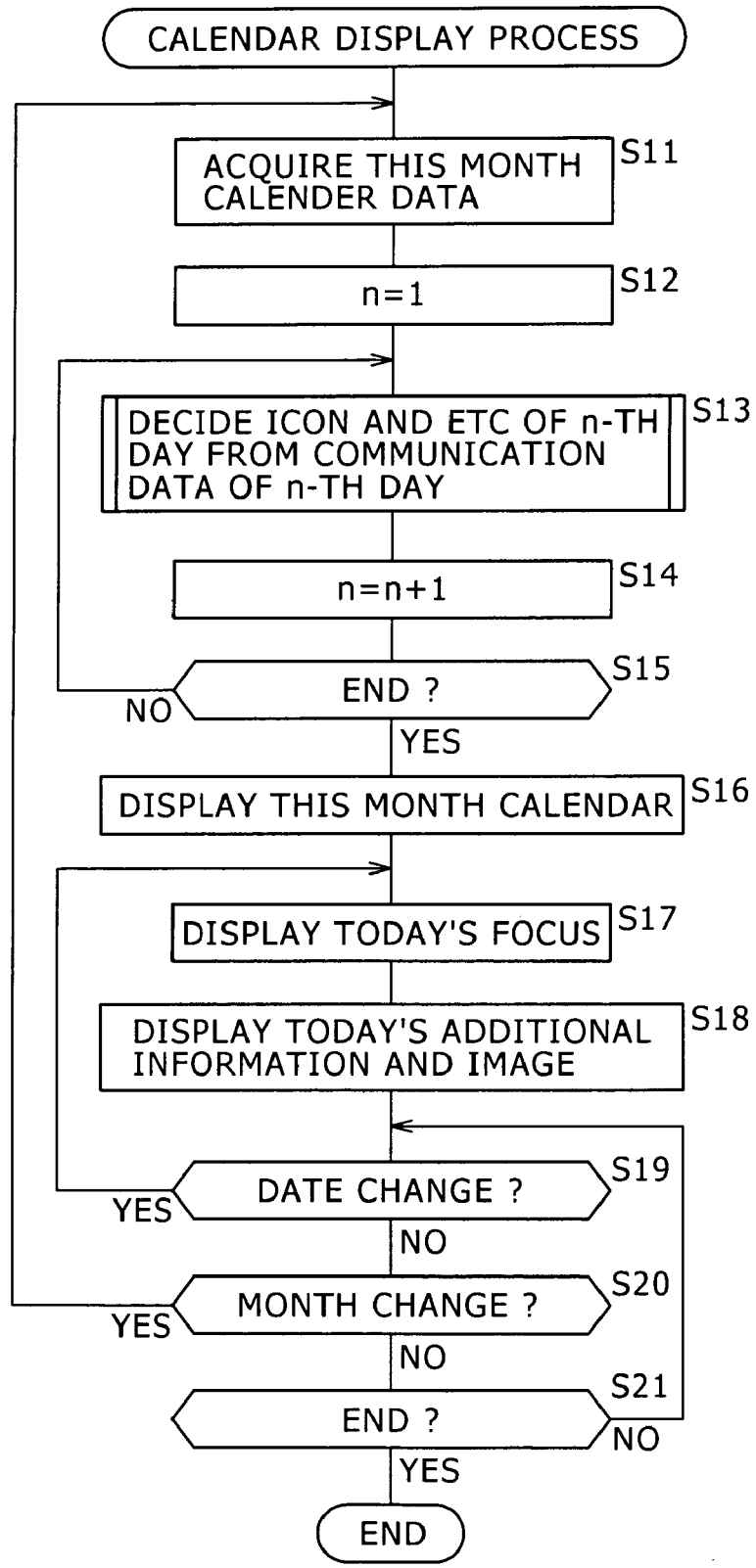
FIG. 13 is a flow chart illustrating a calendar display process according to the embodiment of the present invention.

FIG. 13 is a flow chart illustrating a calendar display process.

First, the present month calendar data is acquired from the memory 227 (S11). A variable n representative of a date is set to "1" (S12) to thereafter advance to the next Step. Namely, in accordance with communication data of the n-th day of the communication history information stored in the memory 227 and in accordance with the judgment result of the above-described parameters, the icon and the like (including image and additional information) of the n-th day are decided (S13). Next, the variable n is incremented (S14) and the flow returns to Step S13 to repeat the above Steps until the last effective day of this month (S15).

After the last day is set, the present month calendar including the decided icons is displayed (S16). In this calendar display, a today's focus is displayed (S17). Additional information and images of today decided by the judgment result at Step S13 are displayed in the additional information display area 620 and image display area 630, respectively (S18).

As the user moves the cursor and the date is changed (S19), the flow returns to Step S17 whereat the focus together with the additional information of this date is displayed.

As the user changes the month by a predetermined operation (S20), the flow returns to Step S11 to repeat the above-described processes. The flow returns to Step S19 until the user instructs to terminate the calendar display (S21).

Figure 14:
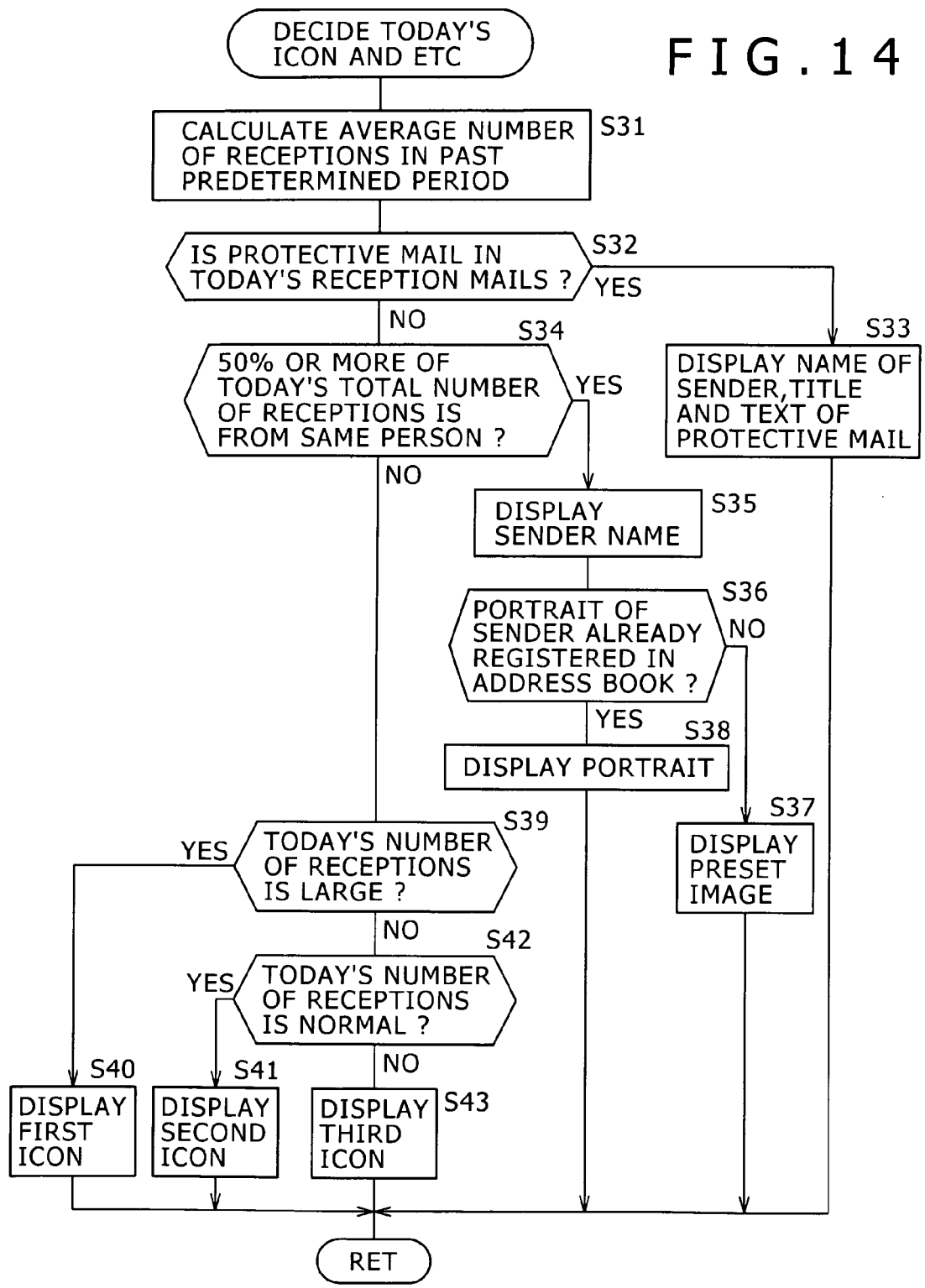
FIG. 14 is a flow chart illustrating a specific process example of deciding an icon and the like in the present day at Step S13 shown in FIG. 13.

FIG. 14 is a flow chart illustrating a specific process example of deciding an icon and the like of the present day at Step S13 shown in FIG. 13.

First, an average number of receptions during a past predetermined period before the present day (S31). Next, it is checked whether a protective mail exists in mails received in the present day (S32). If exists, the sender of the protective mail, its name, a title and contents are used as the display contents of the present day (S33).

If it is judged at Step S32 that a protective mail does not exist, it is checked whether 50% or more of mails among the total number of receptions of the present day are sent from the same sender (S34). If the same sender sent 50% or more of the mails, the name of the sender is used as a display subject (S35). If the portrait photograph of the sender is already registered in the address book (S36), the portrait photograph is used as the display subject in the image display area 630 (S38). If not registered, a preset image is used as a display subject in the image display area 630 (S37).

If it is judged at Step S34 that 50% or more of the mails among the total number of receptions of the present day were not sent by the same sender, it is checked whether the number of receptions in the present day is large (equal to or larger than the threshold value Th2) (S39). If large, the first icon 703 is used as the display subject in the present day field of the calendar (S40). If it is judged at Step S39 that the number of receptions is not large, it is checked whether the number of receptions in the present day is normal (equal to or larger than the threshold value Th1) (S42). If normal, the second icon 702 is used as the display subject in the present day field of the calendar (S41). If it is judged at Step S42 that the number of receptions is not normal, the third icon 701 is used as the display subject in the present day field of the calendar (S43).

Figure 15:
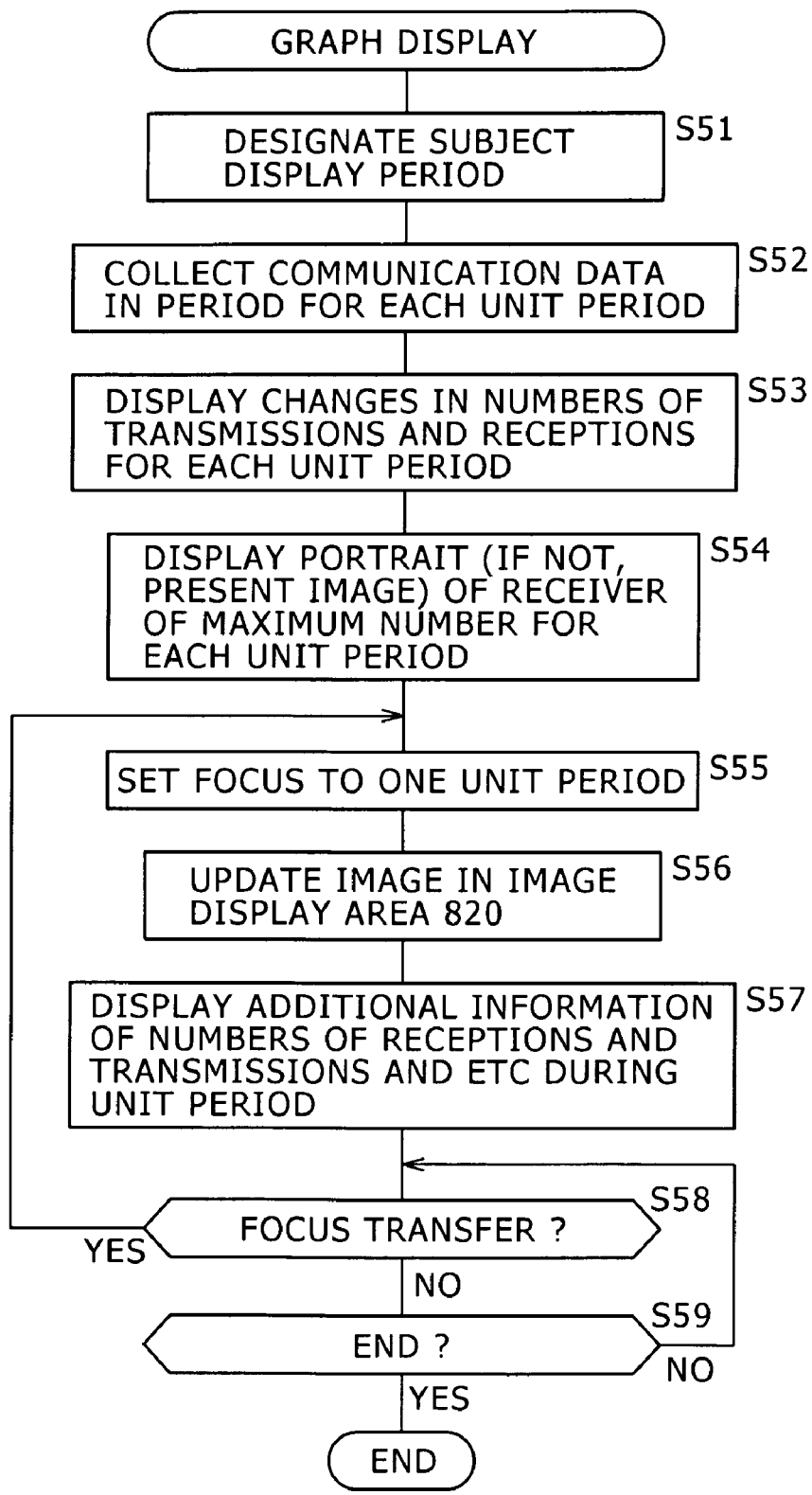
FIG. 15 is a flow chart illustrating a specific process example of displaying a graph explained with reference to FIG. 12.

FIG. 15 is a flow chart illustrating a specific process example of displaying a graph explained with reference to FIG. 12.

As a graph display is activated, a display subject period is first designated (S51). In the example shown in FIG. 12, past weeks and the present week, five weeks in total (approximately one month), are automatically designated as a default display subject period, by using one week as a unit period.

Communication data (in this example, the numbers of mail transmissions and receptions) during the display subject period is collected for each unit period (S52). A change in the numbers of transmissions and receptions for each unit period is displayed as a graph (S53). A portrait photograph (if not present, a preset image) of the maximum mail sender for each unit period is displayed in the graph display area in correspondence with each unit period (S54).

A focus is set to a predetermined default unit period (S55). The portrait photograph of the maximum number sender in the focused unit period is displayed in the image display area 820 (S56). The numbers of receptions and transmissions during this unit period (in the example shown, the average number during one day) and additional information such as preset messages are displayed in the additional information display area 830 (S57).

As the user instructs to move the focus (Yes at S58), the flow returns to Step S55.

As the user instructs to terminate the graph display (Yes at S59), the process is terminated.

According to the embodiment of the present invention, when a calendar is displayed, an image corresponding to a pattern matching the communication history information of each day is displayed in correspondence with each day of the calendar. It is therefore possible to display a communication state of each day visually easy to understand and to make the user interface have entertainment performance.

If an image representative of presence/absence of a protective mail is reflected upon the calendar display, a variety of information can further be presented.

Further, as additional information of a designated day is displayed in an area different from the calendar display area, the presented information can be supplemented.

[Modifications]

Although the preferred embodiment of the present invention has been described above, various modifications and alterations different from the embodiment are possible.

For example, a plurality of background images and dresses of persons may be prepared to be displayed in the calendar display area 610, additional information display area 620 and image display area 630 shown in FIG. 6 and the cloth may be changed at a predetermined timing. For example, background images and clothes suitable for the season of each month are prepared and changed in the unit of month.

Although the use of mail transmission/reception information has been described mainly, the invention is applicable to the use of phone transmission/reception information.

Although transmission information and reception information have been managed in a distinguished manner, the transmission information and reception information may be managed collectively.

Although the present invention is suitable for application to mobile terminal apparatus, the invention is not intended to exclude application to communications by a personal computer (PC) equipped with a communication function.

It should be understood by those skilled in the art that various modifications, combinations, sub-combinations and alterations may occur depending on design requirements and other factors insofar as they are within the scope of the appended claims or the equivalents thereof.

The present invention contains subject mater related to Japanese Patent Application No. JP2005-296155 filed in the Japanese Patent Office on Oct. 11, 2005, the entire contents of which being incorporated herein by reference.

What is claimed is:

1. A communication apparatus comprising:
   a history information storage configured to store history information on-of communications received by said communication apparatus during a display that displays a calendar;
   a computer implemented classifier configured to classify said history information on-of said communications of each day into a plurality of patterns; and
   an image storage configured to store beforehand images corresponding to said plurality of patterns, wherein said display displays an image corresponding to a pattern corresponding to said history information on said communication of each day, in correspondence with each day of the calendar, when said calendar is displayed,
   wherein said display displays, for a day having a predetermined ratio or more of receptions from a same sender among a plurality of receptions, an image representative of said predetermined ratio or more of receptions is being from the same sender, in place of the images corresponding to said plurality of pattern,
   wherein the display displays a plurality of icons within the calendar, each of the icons corresponding to a respective day of the calendar, and each icon being displayed within a display field of the respective day of the calendar,
   wherein each icon corresponds to the pattern in accordance with the classification of the history information of the communication of the respective day of the calendar,
   wherein if there is a protective mail, which is an electronic mail inhibited to be erased, among mails received in a day, the display displays an icon corresponding to the protective mail in correspondence with the day, in place of the images corresponding to the plurality of patterns, and wherein each icon is assigned, based on the history information, in accordance with parameters selected from the group consisting of number of received mails, protective mail, and sender of maximum number of received mails.

2. A communication apparatus comprising:
information storage configured to store history information on-of communications received by said communication apparatus;
a display configured to display a calendar;
a computer implemented classifier configured to classify said history information on said communication of each day into a plurality of patterns; and
storing an image storage configured to store beforehand images corresponding to said plurality of patterns,
wherein said display displays an image corresponding to a pattern corresponding to said history information on said communication of each day, in correspondence with each day of the calendar, when said calendar is displayed,
wherein said communication is an electronic mail, and if there is a protective mail which is a mail inhibited to be erased, among mails received in a day, said display displays an image corresponding to said protective mail in correspondence with the day, in place of the images corresponding to said plurality of patterns,
wherein the display displays a plurality of icons within the calendar, each of the icons corresponding to a respective day of the calendar, and each icon being displayed within a display field of the respective day of the calendar,
wherein each icon corresponds to the pattern in accordance with the classification of the history information of the communication of the respective day of the calendar,
wherein each icon is assigned, based on the history information, in accordance with parameters selected from the group consisting of number of received mails, protective mail, and sender of maximum number of received mails.

3. A communication apparatus comprising:
a history information storage configured to store history information of communications received by the communication apparatus;
a display configured to display a calendar representing predetermined periods;
a computer implemented classifier configured to classify the history information of the communications received in each predetermined period into patterns in accordance with a predetermined threshold value; and
an image storage configured to store images corresponding to the patterns,
wherein the display displays an image with the calendar, the image corresponding to a pattern in accordance with a classification of history information of a communication of a predetermined period: wherein the display displays a plurality of icons within the calendar, each of the icons corresponding to a respective day of the calendar, and each icon being displayed within a display field of the respective day of the calendar,
wherein each icon corresponds to the pattern in accordance with the classification of the history information of the communication of the respective day of the calendar,
wherein if there is a protective mail, which is an electronic mail inhibited to be erased, among mails received in a day, the display displays an icon corresponding to the protective mail in correspondence with the day, in place of the images corresponding to the plurality of patterns; and
wherein each icon is assigned, based on the history information, in accordance with parameters selected from the group consisting of number of received mails, protective mail, and sender of maximum number of received mails.

4. The communication apparatus according to claim 3, wherein the history information storage stores information of communications transmitted by the communication apparatus, and
wherein the classifier classifies the history information of the communications transmitted in each predetermined period into patterns in accordance with a predetermined threshold value.

5. The communication apparatus according to claim 3, wherein the communications are electronic mail type communications.

6. The communication apparatus according to claim 3, wherein the communications are phone call type communications.

7. The communication apparatus according to claim 3, wherein the history information includes the number of received communications, and the history information is classified into the patterns by whether the number of receptions is lower or greater than the predetermined threshold value.

8. The communication apparatus according to claim 3, wherein the display displays, for a day having a predetermined ratio or more of receptions from a same sender among a plurality of receptions, an image representative of the predetermined ratio or more of receptions being from the same sender, in place of the images corresponding to the plurality of patterns.

9. The communication apparatus according to claim 3, further comprising:
an address book storage configured to store an address book for registering information on a communication partner,
wherein the display displays, for a day having a predetermined ratio or more of receptions from the same sender among a plurality of receptions, an image representative of the same sender in a display area different from a display area for the calendar, if the image representative of the same sender is already registered in the address book.

10. The communication apparatus according to claim 3, further comprising:
a designator configured to designate an arbitrary day in the calendar,
wherein the display displays additional information corresponding to a designated day in an area different from a display area for the calendar.

11. The communication apparatus according to claim 3, wherein the communication is an electronic mail, and if there is a protective mail which is a mail inhibited to be erased, among mails received in a day, the display displays an image corresponding to the protective mail in correspondence with the day, in place of the images corresponding to the plurality of patterns.

12. The communication apparatus according to claim 11, wherein the display displays contents of the protective mail in an area different from a display area for the calendar.

13. The communication apparatus according to claim 3, further comprising:
a statistic information extractor configured to extract statistic information from the history information,
wherein separately from the calendar display, the display conducts a graph display of displaying a change in at least one of the number of transmissions and the number of receptions during a predetermined period, in accordance with information obtained by the statistic information extractor.

14. The communication apparatus according to claim 3, wherein the predetermined periods represented by the calendar are days, and the display displays an image for each day in accordance with the history information of communications transmitted or received during that day.

15. The communication apparatus according to claim 3, wherein the communications are phone call type communications, the history information is the number of receptions, and the history information is classified into the plurality of patterns in accordance with whether the number of receptions of each day is large or small.

16. A mobile phone terminal device including the communication apparatus according to claim 3.

17. The communication apparatus according to claim 3, wherein the calendar is a monthly calendar displayed in a matrix shape of days arranged in rows and columns, each of the rows indicating seven days of a week.

\* \* \* \* \*